(12) United States Patent
Liu et al.

(10) Patent No.: US 7,722,911 B2
(45) Date of Patent: May 25, 2010

(54) HIGH AMYLOSE DOG CHEW FORMULATION

(75) Inventors: Ellis Liu, Highlands Ranch, CO (US);
Ted Lengwin, Englewood, CO (US);
Wallace H. Kunerth, Parker, CO (US);
Jeffrey Smith, Parker, CO (US); James M. Quarles, Cedar Rapids, IA (US)

(73) Assignee: Penford Food Corporation, Englewood, CO (US)

( * ) Notice: Subject to any disclaimer, the term of this patent is extended or adjusted under 35 U.S.C. 154(b) by 316 days.

(21) Appl. No.: 11/881,867

(22) Filed: Jul. 30, 2007

(65) Prior Publication Data
US 2008/0063775 A1    Mar. 13, 2008

Related U.S. Application Data

(60) Provisional application No. 60/834,312, filed on Jul. 28, 2006.

(51) Int. Cl.
*A23K 1/18*    (2006.01)

(52) U.S. Cl. .................. 426/658; 426/104; 426/637; 426/635; 426/512; 426/805

(58) Field of Classification Search .......... 426/658, 426/637, 635, 512, 805, 104
See application file for complete search history.

(56) References Cited

U.S. PATENT DOCUMENTS

| | | |
|---|---|---|
| 4,726,957 A | 2/1988 | Lacourse et al. |
| 5,314,754 A | 5/1994 | Knight et al. |
| 5,407,661 A | 4/1995 | Simone et al. |
| 5,665,152 A | 9/1997 | Bassi et al. |
| 5,827,565 A | 10/1998 | Axelrod |
| 5,941,197 A | 8/1999 | Axelrod |
| 6,086,940 A | 7/2000 | Axelrod |
| 6,159,516 A | 12/2000 | Axelrod et al. |
| 6,455,083 B1 | 9/2002 | Wang |
| 6,672,252 B2 | 1/2004 | Levin et al. |
| 2002/0146492 A1* | 10/2002 | Bindzus et al. ............. 426/242 |
| 2003/0221220 A1 | 11/2003 | Broglie et al. |
| 2004/0086616 A1 | 5/2004 | Nie et al. |
| 2004/0197455 A1 | 10/2004 | Nie et al. |
| 2006/0188611 A1* | 8/2006 | Unlu et al. .................... 426/89 |
| 2006/0193959 A1 | 8/2006 | Nie et al. |

OTHER PUBLICATIONS

International Search Report for International Application No. PCT/US07/17021, dated Dec. 13, 2007.
International Preliminary Report on Patentability for International Application No. PCT/US07/17021 dated Feb. 3, 2009.

* cited by examiner

*Primary Examiner*—C. Sayala
(74) *Attorney, Agent, or Firm*—Marshall, Gerstein & Borun LLP

(57) ABSTRACT

The invention provide methods and materials for producing nutritious pet chews comprising an edible thermoplastic comprising from 45 to 80 wt. % starch selected from one or more potato and non-potato starches wherein said starch comprises at least 28% amylose as determined by size exclusion chromatography if less than 50% of said starch is potato starch or at least 20% amylose as determined by size exclusion chromatography if greater than or equal to 50% of said starch is potato starch; from 5 to 25 wt. % plasticizer; 2% to 15 wt % of a humectant and from 5 to 25 wt. % water.

27 Claims, No Drawings

HIGH AMYLOSE DOG CHEW FORMULATION

RELATED APPLICATION DATA

This application claims benefit of provisional application U.S. Ser. No. 60/834,312 filed Jul. 28, 2006 the disclosure of which is hereby incorporated by reference.

BACKGROUND OF THE INVENTION

The present invention relates to pet chews for dogs and other animals. Animal bones have traditionally been provided to pets to provide nutrition, as play objects, and to promote the dental health of the animals. However, some animal bones can splinter and cause internal injury to the pet.

Accordingly, many alternative chews have been developed for use by pets such as rawhide bones. Chews made of rawhide may be quickly destroyed by the chewing action of the pet. In particular, dogs can tear large pieces off of a rawhide chew which they can then swallow with the possibility of resulting intestinal blockages. Synthetic alternatives to rawhide chews are inedible and provide little nutrition.

Other synthetic chews have been formed of hard plastic in the form of a bone. Such plastic chews are also subject to splintering and they are also inedible and provide no nutrition to the pet. More recently pet chews have been formed from starch and protein-based materials but there still remains a risk of breakage and splintering.

Of interest to the present application is the disclosure of Wang, U.S. Pat. No. 6,455,083 which discloses an edible pet chew comprising 30 to 50% protein, about 20 to 50% starch, about 10 to 20% water and about 1 to 10% edible fiber wherein the starch can be corn starch, including maize, waxy maize, and high amylose corn starch, potato starch, sweet potato starch, wheat starch, rice starch, tapioca starch, and combinations thereof.

Levin et al. U.S. Pat. No. 6,672,252 discloses chew formulations comprising starch and protein polymers and further comprising fiber and other hard components.

Axelrod U.S. Pat. Nos. 6,159,516 and 6,086,940 disclose methods of producing pet chews comprising starch and water and introducing the mixture into a vented barrel extruder to form extruded beads wherein the water content of said beads upon discharge from said extruder is less than the water content of said mixture entering the extruder. The extruded beads are then introduced into a heated injection molding machine and injection molding and cooling to form a pet chew or other molded article.

Axelrod U.S. Pat. No. 5,827,565 discloses a method of producing a hardness-adjustable edible dog chew, comprising the steps of: extruding a mixture of a potato starch, water and calcium carbonate to form granules; and injection molding the mixture into the shape of the dog chew. Axelrod, U.S. Pat. No. 5,941,197 discloses a carrot-based pet chew.

Also of interest are the disclosures of Nie et al., published US applications US 2004/0197455 and US 2004/0086616 which are directed to chew formulations comprising starch, plasticizers, water and other ingredients wherein a portion of the starch is retrograded.

While starch-based pet chew formulations have proven useful and popular with pets, such formulations having high levels of starch are characterized by a number of processing difficulties as a result of the adhesive properties of the starch and other components. In particular, the compositions tend to stick to and resist easy release from the processing equipment such as extruders and injection molding equipment used to produce the pet chews. Not only do the starch-based pet chew products resist completely filling molds with the result of defective chews but the pet chews also resist release from the molds which cause incomplete pet chews and fouling of the molding equipment.

SUMMARY OF THE INVENTION

The present invention provides a composition for the formation of pet chews which exhibits improved processing properties in extrusion and injection molding. The products are also characterized by improved flexibility and resist the formation of sharp edges upon breaking. The product also has improved digestibility once consumed by an animal thus reducing the chances of choking or intestinal blockages.

The present invention is based upon the observation that edible thermoplastic compositions comprising from 45 to 80 wt. % starch selected from one or more potato and non-potato starches wherein the starch comprises at least 28% amylose as determined by size exclusion chromatography if less than 50% of said starch is potato starch or at least 20% amylose as determined by size exclusion chromatography if greater than or equal to 50% of said starch is potato starch have improved processing characteristics in extrusion and injection molding. Specifically, the invention provides improved nutritious pet chews comprising an edible thermoplastic comprising from 45 to 80 wt. % starch wherein said starch comprises at least 28% amylose as determined by size exclusion chromatography if less than 50% of the starch is potato starch or at least 20% amylose as determined by size exclusion chromatography if greater than or equal to 50% of said starch is potato starch; from 10% to 25% plasticizer; 2 to 10% humectant and from 5 to 20 wt % water.

The compositions of the invention provide improved runability through extruders (increased lbs/hour) with improved finished product quality in that the edible thermoplastic is less sticky and the resulting chew products are smoother, more flexible, tougher and less brittle. The compositions of the invention provide improved mold filling and better molding with fewer filling flaws and the ability to produce more intricate pieces. The materials further provide better release from the molds, faster cycle times (more pieces per unit time), lower cycle temperatures and fewer defects. In addition, the pet chews produced according to the method of the invention are characterized by better translucency and clarity.

Both chemically modified and native, unmodified starches may be used according to the invention provided that the amylose content of the starch portion be in excess of 28 wt. %. If a native starch is used, the native starch preferably includes corn starch, high amylose corn starch, potato starch, sweet potato starch, wheat starch, rice starch, tapioca starch, sorghum starch, pea starch with high amylose pea starch having amylose levels of 60 to 70% being particularly preferred and a combination of these and other native, unmodified starches. It has been found that compositions comprising a significant proportion of potato starch are effective at lower amylose contents than those comprising a majority (including 100%) corn starch. Thus formulations in which the starch is primarily corn starch (comprising all types of corn starch including high amylose corn starch) should have amylose contents greater than 28%. Preferred compositions include those in which at least 50% or more preferably at least 75% of the starch is potato starch.

Examples of chemically modified starches that may be used in the present invention include, but are not limited to, hydroxyethyl starch, hydroxypropyl starch, carboxymethyl starch, acetylated high amylose starch, starch acetate, starch maleate, starch octenylsuccinate, starch succinate, starch phthalate, hydroxypropyl high amylose starch, cross-linked starch, starch phosphates, hydroxypropyl distarch phosphate, starch propionamide, and combinations of these and other chemically modified starches.

The edible thermoplastic comprises from 45 to 80 wt. % starch and more preferably comprises from 50 to 75 wt % starch and most preferably from 55 to 65 wt % starch. Both single and multiple starches can make up the starch component of the inventive compositions. Where multiple starches are used, it is not necessary that each starch have an amylose content greater than 28%, but rather that the starches collectively be characterized by an overall amylose content greater than 28%. Preferably, the starch component have an amylose content of at least 29 wt. % or 30 wt. % amylose and more preferably an amylose content of at least 31% amylose. The amylose content of the starch is preferably less than 90% and more preferably less than 80%. According to the present invention, the amylose content is determined by dissolving starch(es) or sample in DMSO and water 90%/10%, heating for 1 hr at 95° C. with mixing, then filtering and running on HPLC using Size Exclusion Chromatography. The Size Exclusion Chromatography is accomplished using a Shimadzu HPLC with deairated water at 1 ml/min flow rate, 70° C. column temperature and a Waters Ultrahydrogel™ Linear column hooked in series with a Waters Ultrahydrogel™ 120 column. Detection is accomplished with a Shimadzu RI detector. Amylose to amylopectin ratio is determined by measuring the area under the peaks. As one aspect of the invention it is preferred that the starch component be completely gelatinized as a result of cooking in the extruder and/or molding apparatus.

The compositions of the invention further comprise from 10% to 25 wt. % and more preferably 12 to 18 wt. % of a plasticizer. A plasticizer is a small molecular weight material that imparts flexibility to a larger polymer. Suitable plasticizers for use in the invention are preferably edible and include but are not limited to members of the group including glycerin, sorbitan, ethylene glycol, propylene glycol, diethylene glycol and dipropylene glycol, and a combination of these and other edible plasticizers with glycerin being particularly preferred. While sugars and low molecular weigh starch hydrolyzates are frequently considered to be plasticizers they are classified as humectants for purposes of this invention.

The compositions of the invention also comprise from 2 to 15 wt. % of a suitable humectant such as those selected from the group consisting of small molecular weight carbohydrates and their derivatives as well as polyols including sugar alcohols and other suitable small molecular weight materials such as protein hydrolyzates which attract water. Such humectants provide stability, flexibility and shelf life suitable for the specific product. Particularly suitable humectants include sucrose, honey, fructose and sugar alcohols such as sorbitol and mannitol. These also provide sweetness. Other suitable sweeteners which can sometimes act as humectants include Stevia, Aspartame (NutraSweet, Equal, Canderel), Neotame, Sucralose (Splenda, Altem), acesulfame-K (Sunette, Sweet & Safe, Sweet One), saccharin, cyclamates and other low carbohydrate sweeteners, rice syrup, honey, licorice root (small amounts), refined sugar, evaporated cane juice, fruit juice, fructooligosaccharides (FOS), high fructose sweeteners, Amasake, vegetable glycerin, sugar alcohols (xylitol, sorbitol), maple syrup (with or without added sugar), barley malt and oat fiber.

The edible thermoplastic compositions comprise different levels of water during different points of processing. Thus, the water content of the composition introduced into the extruder should be between 15 and 30 wt % and more preferably between 15 and 24 wt. %. Moisture loss (flash) from the extruder preferably renders a product with a moisture content of less than 18 wt. % and more preferably less than 16 wt. %. Further drying can leave the product less that 15 wt. % but preferably more than 8 wt. % moisture.

In addition to starch, plasticizer, humectant and water components, the edible thermoplastic used in the practice of the invention may also comprise a number of optional additional components to provide or improve various properties. Up to 10% of a strength aid including, minerals such as TALC, synthetic and natural polymers such as cellulose or hemicellulose may be incorporated into the compositions. Particularly preferred are cellulose fibers with fiber lengths around 300 μm as well as corn, pea, wheat, soy including citrus and other vegetable type fibers. Other solid particulates may also be incorporated into the pet chew compositions.

Lubricants such as lecithin, sodium stearyl lactylate and other stearates can also be added to the composition at levels generally less than 2 wt. %. In addition, fats present in flavoring agents can sometimes provide a lubrication effect.

Flavors and palatability enhancers can also be incorporated into the compositions. Natural or artificial sweeteners can be incorporated into the compositions as concentrations of not more than 7 wt. %. Palatability enhancers such as poultry or liver extracts can be added at concentrations generally not exceeding 3 wt. %. In certain embodiments the edible thermoplastic of the present invention may contain flavorings in order to be more palatable to a pet. The flavoring is preferably present in an amount ranging from about 0.5 to 15 wt. %. These flavorings may include such natural flavorings as chicken powder, turkey powder, onion powder, garlic powder, plant oils, meat, animal products, chicken meat, chicken fat, beef hide, beef meat, beef fat, pork skin, pork meat, pork fat, and a combination of these and other flavorings. Artificial flavors may also be used in place of animal products. Colors can also be added to the compositions to increase the attractiveness of the pet chews.

Nutritional additives including vitamins and minerals such as Vitamin A, B vitamins, Vitamin C, Vitamin D, Vitamin E, iron, sodium, calcium, potassium, and magnesium, can be incorporated into the chew bones at levels that would be apparent to those of ordinary skill in the art. Other nutrients may be contained in trace concentrations such as iron, phosphorus, zinc, manganese, iodine, selenium, cobalt, niacin, biotin, menadione, folic acid, pyridoxine, and combinations thereof.

In certain embodiments the thermoplastic contains a hygiene additive to clean and care for the pet's mouth. Typical hygiene additives may include an anti-tartar agent, calcium pyrophosphate, sodium tripolyphosphate, zinc citrate, calcium hydrogen phosphate, dementholized peppermint oil, spearmint oil, sorbitol, and sorbitan. Anti-plaquing agents such as hexametaphosphate for teeth cleaning may also be incorporated into the compositions as may glucosamine and/or chondrotin for joint health and beta-glucans for heart health. Other additives include preservatives with the incorporation of sorbic acid at 0.3 wt. % being particularly preferred.

As will be appreciated by those of ordinary skill adjustments can be made in the physical properties of the resulting pet chew by making adjustments to the concentrations of various components. Thus, substituting 2.6% sucrose for 2.6% sorbitol increases the flexibility of the piece while retaining its toughness.

The physical properties of the resulting pet chews can also be adjusted by modifying the process parameters. One approach to increase the softness of the chew is to decrease its density by allowing it to expand more out of the product densification unit (PDU). This can be accomplished by increasing the frictional energy (decreasing the water) or by increasing the thermal energy so the material coming out of the PDU is hotter. Another way to increase the softness is to increase the fat content of the product.

One particularly preferred composition for practice of the invention comprises the combination of 42.7% native potato starch having an amylose content of 15% as measured by size exclusion chromatography (PenCook® 10); 11.4% modified potato starch having an amylose content of 20% as measured by size exclusion chromatography (PenCling® 320); 10.2% high amylose corn starch having an amylose content of 49% as measured by size exclusion chromatography (Gelose 50) (the amylose content of the starch portion being about 21%); 1% lecithin (Lecigran 1000p); 4.5% fiber (Creafil fiber TC 180); 0.3% calcium stearate; 3% sorbitol; 0.2% sorbic acid; 15.7% glycerin and 11.1% water. Flavoring agents, palatability enhancers and coloring agents may be added to the resin either prior to or at the time of injection molding.

DETAILED DESCRIPTION

According to one aspect of the invention, the components of the edible thermoplastic compositions are combined and heated and extruded using one or more extruder devices to provide thermoplastic pellets. Suitable extruder devices include single screw extruders and twin-screw extruders such as those produced by Wenger Manufacturing (Sabetha, Kans.) including those such as Coperion Werner & Pfleider (ZSK-30, ZSK-58) (higher shear twin screw); Wenger TX series (TX-57, TX 80, etc) (medium shear twin screw) and Extrutech (Sabetha, Kans.) model E525 single screw extruder. The extruded pellets may be dried and stored for later molding into pet chews or may be introduced immediately into an injection molding device to form a chew. By adjusting the equipment a suitable finished piece can be made directly from the extruder/PDU without the need for injection molding.

Injection molding machines used in the plastics industry are generally suitable for practicing the invention provided that the temperatures of the injection can be controlled in the range of 170°-280° F. and cooling can be applied at the mold after injection of the molten resin. Such injection molding machines useful in practice of the invention typically contain a hopper feed section, a barrel and an output nozzle, including a plurality of heating zones in the barrel extending from the hopper section to the nozzle. It is preferred to maintain the temperature in the first zone adjacent the hopper at a temperature of about 200° F. Successive zones preferably have temperatures ranging from 190° to 230° F. Preferred nozzle temperatures range from about 240° to 280° F.

The resulting pet chew may be formed to be substantially linear or may be curved, circular, or take on any shape. The pet chew preferably has a convenient length ranging from about 4 to 12 inches, although the length can extend up to several feet if desired.

According to one aspect of the invention a twin screw extruder can be used in place of the single screw and the PDU.

In addition, the materials can be placed in a coextruder where a different material is used in the center according to methods known to the art.

EXAMPLE 1

According to this example, compositions comprising starch, plasticizer (glycerin), humectant (sorbitol, sucrose or corn syrup solids DE 42) and water were processed according to the following procedure in combination with conventional additives to produce edible thermoplastic beads which can later be molded to form pet chews. The formulations also included minor additional ingredients including lecithin (Lecigran™ 1000p, Cargill), cellulosic fiber, (Creafill fiber TC180, Creafill Fibers Corp., Chestertown, Md.), sodium stearoyl lactylate, (Paniplex® SK, ADM), sorbic acid and a yeast-based flavor enhancer. Formulations 1A-1G were generally similar, the exception being the amylose content of the starches used. In Run 1A a waxy corn starch was used having 100% amylopectin (0% amylose) while Runs 1B-1G used different combinations of a pearl (dent) starch having an amylose content of about 25% when measured by size exclusion chromatography and a high amylose starch Gelose®50 having an amylose content of about 49% when measured by size exclusion chromatography. The ingredients set out in Table 1 below were measured and blended together in a paddle mixer. The material was then conveyed to a hopper and was metered into a preconditioner. The moisture was adjusted to 22% and the temperature to 160 to 180° F. with steam.

The blended materials having a moisture content of 22% were then fed into a Extrutech (Sabetha, Kans.) single screw extruder having three cook sections and a head section. The extruder screw was operated at 315 rpm and steam was added to achieve an initial temperature of 220° F. Zone one was operated at a temperature of 220° F. and zones 2 and 3 were operated at 250° F. The head section was operated at 250-300° F. at a pressure of 200 psig. The extruder was operated at sufficient shear so as to completely cook out the starch components.

The blend of ingredients was extruded under high shear and temperature sufficient to cook out the starch (destroy the granules) as completely as possible. The thermoplastic material was then conveyed to the PDU (a second medium shear single screw extruder) for densification of the material which was accomplished by removing trapped air. A cutter was running on the end of this extruder to produce a bead with approximate dimensions of 4 to 3.5 mm (length to diameter).

The resin beads were then air transported to a dryer at 170 to 180° F. to further reduce the moisture to about 14 wt. % and placed in a tumbler with air cooling. The beads had a density of about 75-83 lbs/ft$^3$. The beads were then packed for later use in an injection molder to form chew products. Such molded pet chews typically have a slightly higher density of about 83-94 lbs/ft$^3$.

To show the importance of increasing the amylose content of the starch, different compositions of starch ranging from waxy with no amylose to unmodified corn starch with 25% amylose to blends of corn starch with high amylose starches were used in identical formulations. These blends of ingredients were then run through the bead making process and scored for runability on a scale of 1 to 10 with a score of 1 being very good and a score of 10 being very poor. The results of that evaluation are set out below.

TABLE 1

| Item Name | 1A | 1B | 1C | 1D | 1E | 1F | 1G |
|---|---|---|---|---|---|---|---|
| Waxy Corn Starch | 58.8% | | | | | | |
| Pearl Corn | | 48.7% | 43.7% | 43.7% | 58.8% | 43.7% | 45.6% |
| Gelose 50 | | 10.1% | 15.1% | 15.1% | | 15.1% | 15.10% |
| Glycerin | 14.16% | 14.16% | 14.16% | 14.16% | 10.16% | 10.16% | 14.16% |
| Water | 14.9% | 14.9% | 14.9% | 14.9% | 18.9% | 18.9% | 14.9% |
| Sorbitol | 4.6% | 4.6% | | | | 4.6% | 2.60% |
| Sucrose | | | 4.6% | | | | |
| Corn Syrup Solids 42 DE | | | | 4.6% | | | |
| Lecithin (Lecigran 1000p) | 0.9% | 0.9% | 0.9% | 0.9% | 0.9% | 0.9% | 0.90% |
| Fiber (Creafil fiber TC 180) | 3.7% | 3.7% | 3.7% | 3.7% | 3.7% | 3.7% | 3.70% |
| Sodium Stearyl Lactylate (Paniplex SK) | 0.5% | 0.5% | 0.5% | 0.5% | 0.5% | 0.5% | 0.50% |
| Sorbic Acid | 0.2% | 0.2% | 0.2% | 0.2% | 0.2% | 0.2% | 0.20% |
| Flavor enhancer | 2.3% | 2.3% | 2.3% | 2.3% | 2.3% | 2.3% | 2.30% |
| | 100.00% | 100.00% | 100.00% | 100.00% | 100.00% | 100.00% | 100.00% |
| Runability Score | 9 to 10 Ran very poorly, major sticking problems | 4 to 5 Problems but manageable | 1 to 2 Ran well | 1 to 2 Ran well | 9 to 10 Ran very poorly, some sticking and puffing out of PDU | 1 to 2 Ran well | 1 to 2 Ran well |

Evaluation of the resulting products showed that the use of amylose levels in excess of 28% promoted improved processing properties. In particular, Run 1A on the product comprising 100% waxy pearl starch (with a 0% amylose content) as the starch component produced a very sticky product which did not run well. Run 1E on the product comprising 100% pearl (dent) corn starch comprising about 25% amylose also did not run well and even puffed out of the extruder. Progressively better properties were exhibited with the composition of Run 1B comprising 10% of the Gelose®50 high amylose starch for a total of 29% amylose and better still with the compositions of 1C, 1D, 1F and 1G comprising 15% of the Gelose®50 high amylose starch for a total of 31% amylose.

EXAMPLE 2

The pellets formed in Example 1 were then used to produce bone-shaped pet chews using an injection molding device according to conventional methods. Barrel temperature of the injection molder was 200° to 210° F. with an injection temperature of 260° F.

Pet chews formed according to the processes above and having starch contents of 100% waxy starch (0% amylose); 100% pearl (dent) corn starch (less than 25% amylose); a blend comprising about 27% amylose; and a blend of starches comprising about 31% amylose were compared. The pet chew formed from 100% amylopectin/0% amylose (Run 1A) had significant sticking problems and failed to fill the molds properly. The pet chews comprising 25% amylose (Run 1E) were superior to those formed from waxy starch but still had sticking problems and failed to completely fill the molds. The pet chews comprising about 29% amylose (Run 1B) still had problems with stickiness but had improved shapes compared to those of the 0% amylose and 25% amylose compositions. Finally, the pet chews comprising starch mixtures totaling 31% amylose (Runs 1C, 1D, 1F and 1G) were well formed, were not sticky and had good mold release properties.

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. A nutritious pet chew comprising an edible thermoplastic comprising from 45 to 80 wt. % starch selected from one or more potato and non-potato starches wherein said starch comprises at least 28% amylose as determined by size exclusion chromatography if less than 50% of said starch is potato starch or at least 20% amylose as determined by size exclusion chromatography if greater than or equal to 50% of said starch is potato starch; from 5 to 25 wt. % plasticizer; 2% to 15 wt % of a humectant and from 5 to 25 wt. % water.

2. The nutritious pet chew of claim 1 wherein 100% of said starch is corn starch.

3. The nutritious pet chew of claim 1 wherein at least 50% of said starch is potato starch.

4. The nutritious pet chew of claim 1 wherein at least 75% of said starch is potato starch.

5. The nutritious pet chew of claim 1 wherein said starch comprises at least 28% amylose.

6. The nutritious pet chew of claim 1 wherein said starch comprises at least 31% amylose.

7. The nutritious pet chew of claim 1 wherein said edible thermoplastic comprises from 50 to 75 wt % starch.

8. The nutritious pet chew of claim 1 wherein said edible thermoplastic comprises from 55 to 65 wt % starch.

9. The nutritious pet chew of claim 1 wherein said edible thermoplastic comprises from 10 to 20 wt % plasticizer.

10. The nutritious pet chew of claim 1 wherein said edible thermoplastic comprises from 2 to 10 wt. % humectant.

11. The nutritious pet chew of claim 1, wherein the starch is a native, unmodified starch.

12. The nutritious pet chew of claim 1 wherein the starch is a native starch selected from the group consisting of corn starch, high amylose corn starch, potato starch, sweet potato starch, wheat starch, rice starch, tapioca starch, sorghum starch, and pea starch.

13. The nutritious pet chew of claim 1 wherein the starch is high amylose corn starch.

14. The nutritious pet chew of claim 1 wherein the starch is high amylose pea starch.

15. The nutritious pet chew of claim 1, wherein the plasticizer is selected from the group consisting of glycerin, ethylene glycol, propylene glycol, diethylene glycol, arid dipropylene glycol.

16. The nutritious pet chew of claim 1 wherein the plasticizer is glycerin.

17. The nutritious pet chew of claim 1 wherein the humectant is selected from the group consisting of sorbitol, mannitol, sucrose, fructose, galactose, mahodextrins, dextrins, corn syrups , honey and other saccharides and polyols.

18. The nutritious pet chew of claim 1 wherein the humectant is sorbitol.

19. The nutritious pet chew of claim 1 which comprises from 1 to 10 wt. % of a strength aid.

20. The nutritious pet chew of claim 1, wherein the strength aid is selected from the group consisting of insoluble dietary fiber, insoluble natural cellulose fiber, synthetic polymers and minerals.

21. The nutritious pet chew of claim 1 which comprises from 0.5 to 2 wt. % of a lubricant such as lecithin, SSL, Calcium stearate or the like.

22. The nutritious pet chew of claim 1, wherein the lubricant is lecithin.

23. The nutritious pet chew of claim 1, further comprising about 0.5 to 5 wt. % flavoring.

24. The nutritious pet chew of claim 1, further comprising a flavoring selected from the group consisting of chicken powder, turkey powder, liver powder, onion powder, garlic powder, plant oils, vanilla, meat, animal products, chicken meat, chicken fat, beef hide, beef meat, beef fat, pork skin, pork meat, pork fat, and dried meat floss.

25. A method of producing a nutritious pet chew comprising the steps of producing an edible thermoplastic comprising from 45 to 80 wt. % starch selected from one or more potato and non-potato starches wherein said starch comprises at least 28% amylose as determined by size exclusion chromatography if less than 50% of said starch is potato starch or at least 20% amylose as determined by size exclusion chromatography if greater than or equal to 50% of said starch is potato starch; from 5 to 25 wt. % plasticizer; 2% to 15 wt % of a humectant and from 5 to 25 wt. % water and molding said edible thermoplastic under heat and pressure conditions sufficient to produce a pet chew characterized by a density between 1.1 and 1.6 grams per cc.

26. A method of producing nutritious pet chew comprising the steps of producing an edible thermoplastic comprising from 45 to 80 wt. % starch selected from one or more potato and non-potato starches wherein said starch comprises at least 28% amylose as determined by size exclusion chromatography if less than 50% of said starch is potato starch or at least 20% amylose as determined by size exclusion chromatography if greater than or equal to 50% of said starch is potato starch; from 5 to 25 wt. % plasticizer; 2% to 15 wt % of a humectant and from 5 to 25 wt. % water and extruding said edible thermoplastic under heat and pressure conditions sufficient to produce edible thermoplastic beads which beads are subsequently molded under heat and pressure conditions sufficient to produce a pet chew characterized by a density of 1.1 to 1.6 g/cc.

27. A method of producing nutritious pet chew comprising from 45 to 80 wt. % starch selected from one or more potato and non-potato starches wherein said starch comprises at least 28% amylose as determined by size exclusion chromatography if less than 50% of said starch is potato starch or at least 20% amylose as determined by size exclusion chromatography if greater than or equal to 50% of said starch is potato starch; from 5 to 25 wt. % plasticizer; 2% to 15 wt % of a humectant and from 5 to 25 wt. % water and extruding said edible thermoplastic under heat and pressure conditions sufficient to produce edible thermoplastic that can be shaped directly off the extruder (twin screw) or shaped directly off the to produce a pet chew characterized by a density of 0.8 to 1.4 g/cc.

* * * * *

UNITED STATES PATENT AND TRADEMARK OFFICE
CERTIFICATE OF CORRECTION

PATENT NO. : 7,722,911 B2  Page 1 of 1
APPLICATION NO. : 11/881867
DATED : May 25, 2010
INVENTOR(S) : Ellis Liu et al.

It is certified that error appears in the above-identified patent and that said Letters Patent is hereby corrected as shown below:

At Column 9, Claim 17, Line 20, please delete "mahodextrins" and insert --maltodextrins--

Signed and Sealed this

Tenth Day of August, 2010

David J. Kappos
*Director of the United States Patent and Trademark Office*